Figure 1:
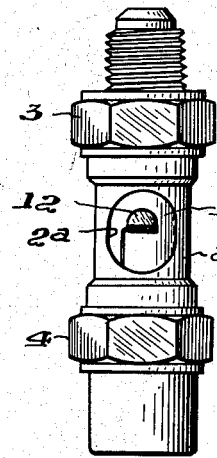

Nov. 24, 1953

K. M. NEWCUM 2,660,144

INDICATOR FOR VISUALLY OBSERVING
FLOW OF A LIQUID THROUGH A PIPE
Filed Oct. 26, 1951

INVENTOR.
Kenneth M. Newcum
BY
Brown, Critchlow, Flick & Peckham
ATTORNEYS.

Patented Nov. 24, 1953

2,660,144

UNITED STATES PATENT OFFICE 2,660,144

INDICATOR FOR VISUALLY OBSERVING FLOW OF A LIQUID THROUGH A PIPE

Kenneth M. Newcum, Zelienople, Pa., assignor to Remco Incorporated, Zelienople, Pa., a corporation of Pennsylvania Application October 26, 1951, Serial No. 253,247

3 Claims. (Cl. 116—117)

The invention relates to what are generally designated as liquid indicators or sight glasses, which are relatively small structures that are placed in and form parts of liquid pipe lines for observing the liquid that is in or flowing through the lines. They are commonly used in liquid refrigerant pipe lines in refrigeration systems, and it is to such structures, and for such use, that the invention is particularly applicable.

A liquid, or sight glass, indicator of this type includes a transparent tube formed of glass or of a plastic, the tube usually being enclosed in a metal casing that is provided with cut-away portions that form windows through which a portion of the transparent tube is visible.

Liquid refrigerants are usually colorless, in view of which it cannot be determined by observation of the transparent tube whether or not a liquid refrigeration is flowing through the line, or the rate of flow, unless the refrigerant contains bubbles that are formed by partial gasification of the refrigerant. The presence of such bubbles in a liquid refrigerant indicates an undesirable condition in the system that requires correction for efficient operation. As heretofore constructed and used, the prime purpose of such indicators, or sight glasses, has been to determine the presence or absence of bubbles as an indication of the condition of the refrigerants as they are being fed to refrigerant metering devices in refrigeration systems. Nevertheless, it is highly desirable to determine at all times whether the refrigerant is flowing, which, as stated, cannot be determined by observation of the indicators that are now used, unless the refrigerant contains gas bubbles.

The object of this invention is to provide an indicator that visually shows whether or not liquid is flowing in a liquid pipe line, regardless of the condition of the liquid, the indicator being adapted to be positioned in the transparent tube of what is commonly known as a liquid indicator, or sight glass, and to move by the flow of liquid to a position that shows that it is flowing, and to another position when liquid is not flowing.

A further and more specific object is to provide a flow indicator of the type explained which may be placed in a line that extends horizontally, vertically, or at any inclination to the horizontal and vertical, and which performs its stated indication of flow regardless of which direction the liquid may be flowing.

The flow indicator provided according to this invention is adapted to be positioned firmly in a transparent tube that forms a part of a liquid pipe line. The indicator comprises a flap-support and a sheet-like flap that is pivotally borne by the support in such a position within the tube that the flap may be freely swung by the action of the flow of fluid to a position to indicate that the liquid is flowing, and being freely swingable to another position when liquid is not flowing. The flap-support is preferably formed of a resilient wire that is shaped to form a loop of larger normal diameter than the inner diameter of a tube in which it is to be placed, and to have a free end portion that extends diametrically across the tube when the support is placed in the tube, such portion forming a pintle for the flow-indicating flap. So that the flow indicator may be used in any position of a pipe, whether it extends horizontally, vertically, or in an inclined position, the flap is preferably of semi-circular form, and of a smaller radius than the interior of the tube, the flap having at its straight edge an eye that surrounds the pintle portion of the resilient wire support that extends transversely of the top.

Figure 2:
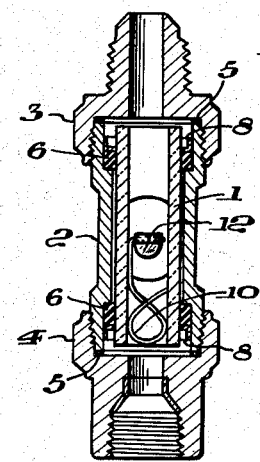
Figures 3, 4:
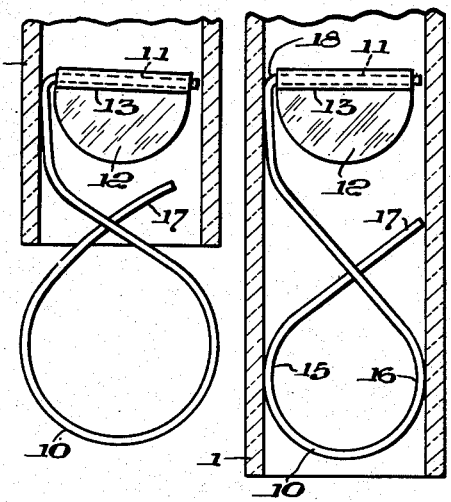
Figures 5, 6, 7:
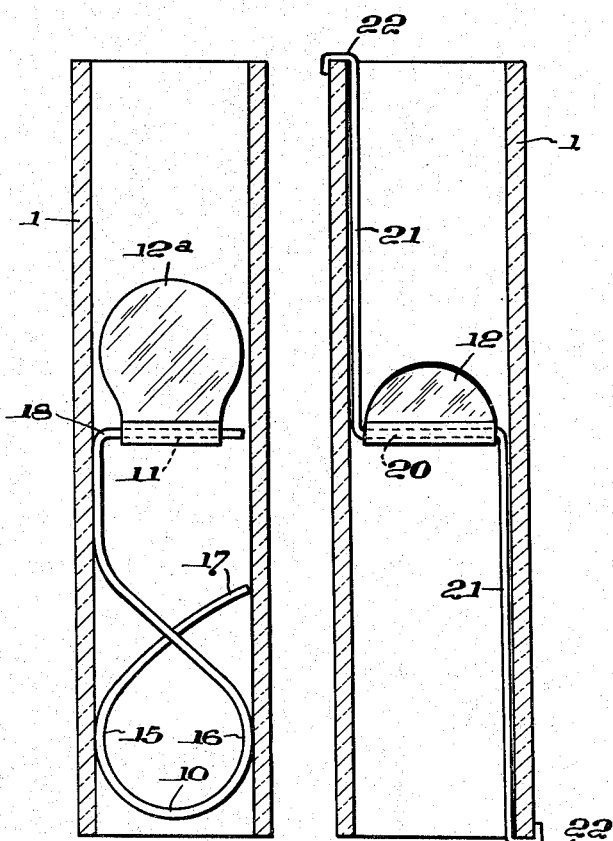

The invention is illustrated in the accompanying drawings in its applicability to a liquid flow indicator constructed to be used in a refrigeration system. In the drawings, Fig. 1 is an elevation of a complete indicator; Fig. 2 is a longitudinal central sectional view, the plane of view being parallel to that of the elevation shown in Fig. 1; Fig. 3 an elevation to enlarged scale of the flow indicator in the position it normally occupies when partly inserted in a transparent tube, an end of which is shown in section; Fig. 4 an elevation of the indicator when it is fully positioned in a transparent tube, the tube being shown in section; Fig. 5 a side view of the end portion of the indicator when positioned in the central portion of a transparent tube, showing the flap in the position it occupies when the liquid flow indicator is placed in a horizontally extending portion of a liquid pipe line with no flow through the tube; Figs. 6 and 7 views corresponding to Fig. 4 showing modifications of construction.

Having reference to the liquid flow indicator shown in Figs. 1 and 2, it comprises a transparent tube 1 that is enclosed in a metal casing 2, provided with cut-away portions 2a that form windows through which the tube may be observed. Attached to the ends of casing 2, there are pipe connectors 3 and 4, the connector 3 being provided with a male, and the connector 4 with a female thread, although both connectors may be provided with either male or female threads. Leakage of refrigerant is prevented by gaskets 5 between the ends of casing 2 and shoulders formed on connectors 3 and 4, and by gaskets 6 that surround transparent tube 1 and are held in sealing position by metal rings 8, and also by the pressure of a refrigerant. The flow indicator presently to be described in detail is positioned within transparent tube 1, which may form a part of the liquid flow indicator shown in Figs. 1 and 2, or a part of any other type of liquid flow indicators.

Having reference now to Fig. 3, the flow indicator preferably consists of a resilient wire that is bent to form a loop 10, which in the normal position of the indicator, that is to say when it is not within a transparent tube is of larger diameter than the inner wall of transparent tube 1. The end portion 11 of the wire is bent to extend diametrically in tube 1 and to form a pintle for a flap 12 which is preferably formed of thin sheet metal and is preferably of semi-circular form. As shown in Fig. 4 the straight edge of flap 12 is bent to cylindrical shape to form an eye 13, which receives pintle portion 11 of the flap support. Preferably the radius of flap 12 is smaller than that of tube 1, so that the flap may swing entirely around the pintle for the purpose presently to be explained. As shown in Fig. 3, pintle portion 11 of the flap-support is slightly inclined toward loop 10, instead of being diametric of tube 1. When loop 10 is diminished in diameter by inserting the flow indicator fully into tube 1, pintle portion 11 assumes a diametrical position, as shown in Fig. 4.

The flow indicator is positioned in a tube 1 by moving it upwardly within the tube as viewed in Fig. 4. When this is done, loop 10 of the resilient wire flap-support is resiliently diminished in diameter by the engagement of loop portions 15 and 16 with the inner wall of the tube. This forces the free end 17 of the wire against the wall of the tube, and causes flap-supporting portion 11 to extend diametrically across the tube at a right angle to its axis. When the flow indicator is positioned in tube 1, it is necessary that the portion 18 of flap-support 10, which adjoins pintle 11, be pressed firmly against the inner wall of the tube firmly to hold the flap in its desired position.

When the liquid flow indicator shown in Figs. 1 and 2 is used in a vertical portion of a liquid pipe line, flow of refrigerant upwardly through the indicator causes flap 12 to move upwardly as shown in Fig. 1. In that position the flap may flutter, but it nevertheless clearly indicates visually that liquid is flowing through the indicator. When under the same conditions there is no flow of liquid through the indicator, flap 12 freely swings downwardly to the position shown in Fig. 2, which visually indicates that there is no flow. When the indicator is positioned horizontally in a horizontal portion of a liquid flow pipe, the flap of the indicator will be moved to a horizontally disposed position when liquid flows through the tube, and will drop to a vertical position when there is no flow of liquid, the latter position of the flap being shown in Fig. 5. These positions of the flap may be observed by looking down on the top of the liquid flow indicator.

While the flap-support is preferably formed to have a loop 10, and a pintle portion 11, as shown in Figs. 3 and 4, different forms of flap-supports may be used. One of such different forms of supports is shown in Fig. 6, the support having a pintle portion 20 and tube engaging portions 21 that extend parallel and adjacent to a tube 1, and have U-shaped ends 22 that extend over the ends of the tube.

The flow indicator shown particularly in Figs. 3 and 4, is non-directional in the sense that it is capable of performing its intended purpose regardless of its position in a liquid pipe line, whether vertical, horizontal, or otherwise. It is capable of doing this because the free rotation of flap 12 about pintle portion 11 of its support is unrestricted. In the embodiment of the invention illustrated in Fig. 7, flap 12a is longer than the radius of the inner wall of tube 1, and accordingly the flap has a limited angle of swinging movement. However, its position in the center of a tube when liquid is flowing through it clearly indicates that fact, and its position against the wall of the tube when there is no liquid flowing clearly indicates that fact. The flow indicator of Fig. 7 is directional in the sense that it can be used only when liquid is flowing in one direction through a tube, namely in the direction indicated by arrows on Fig. 7.

In the foregoing description of the flow indicator, its operation has been fully explained, and hence need not be here repeated.

According to the provisions of the patent statutes, I have explained the principle and mode of operation of my invention, and have illustrated and described the preferred embodiment of it, and modifications of the preferred embodiment. However, I desire to have it understood that, within the scope of the appended claims, the invention may be practiced otherwise than specifically illustrated and described.

I claim:

1. A flow indicator adapted to be positioned in a transparent tube that forms a part of a liquid pipe line, said indicator comprising a flap-support consisting of a resilient wire that is shaped to form a loop of larger normal diameter than the inner diameter of such tube and to have an end pintle portion that extends diametrically across such tube when the indicator is placed in the tube, and a sheet-like flap pivotally borne by said pintle portion, said flap being freely swingable in any position of the tube by the flow of fluid through a tube to a position to indicate that liquid is flowing, and being freely swingable to another position when liquid is not flowing.

2. A flow indicator adapted to be positioned in a transparent tube that forms a part of a fluid pipe line, said indicator comprising a resilient wire flap-support having a pintle portion that extends diametrically across the interior of a tube when the indicator is placed in the tube, and a sheet-like flap of semi-circular form and of smaller radius than that of the interior of the tube, said flap having at its straight edge an eye that loosely receives said pintle portion of said support, said flap being freely swingable by the flow of fluid through the tube to a position to indicate that liquid is flowing, and being freely swingable to another position when liquid is not flowing.

3. A flow indicator adapted to be removably positioned in a transparent tube that forms a part of a liquid pipe line, said indicator comprising a flap-support formed of a single piece of wire having a pintle portion that extends diametrically across the tube when the indicator is placed in the tube and another portion that yieldingly engages the interior wall of the tube, said support having a portion thereof formed to removably engage the wall of said tube, and a sheet-like flap pivotally borne by said pintle portion, said flap being freely swingable by the flow of fluid through the tube in any position of the tube to a position in which the flap indicates that liquid is flowing through the tube, and being freely swingable to another position when liquid is not flowing through the tube.

KENNETH M. NEWCUM.

References Cited in the file of this patent

UNITED STATES PATENTS

| Number | Name | Date |
|---|---|---|
| 1,574,460 | Williamson | Feb. 23, 1926 |
| 2,409,430 | Greenleaf | Oct. 15, 1946 |
| 2,522,207 | Bald | Sept. 12, 1950 |
| 2,548,734 | Mathey | Apr. 10, 1951 |

FOREIGN PATENTS

| Number | Country | Date |
|---|---|---|
| 587,750 | Germany | Nov. 8, 1933 |